(12) United States Patent
Obika

(10) Patent No.: US 8,741,477 B2
(45) Date of Patent: Jun. 3, 2014

(54) BIPOLAR SECONDARY BATTERY WITH SEAL MEMBERS

(75) Inventor: Motoharu Obika, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 212 days.

(21) Appl. No.: 13/375,057

(22) PCT Filed: Jun. 23, 2010

(86) PCT No.: PCT/IB2010/001511
§ 371 (c)(1),
(2), (4) Date: Nov. 29, 2011

(87) PCT Pub. No.: WO2010/150077
PCT Pub. Date: Dec. 29, 2010

(65) Prior Publication Data
US 2012/0070715 A1    Mar. 22, 2012

(30) Foreign Application Priority Data
Jun. 25, 2009    (JP) ................................. 2009-150741

(51) Int. Cl.
*H01M 2/08*    (2006.01)
*H01M 10/04*    (2006.01)
(52) U.S. Cl.
USPC ........................................ 429/185; 429/152
(58) Field of Classification Search
CPC .. H01M 2/08; H01M 10/0418; H01M 10/044
USPC ................................................ 429/152, 185
See application file for complete search history.

(56) References Cited

U.S. PATENT DOCUMENTS

| 5,770,331 | A  | 6/1998 | Olsen et al. |
| 8,415,049 | B2 | 4/2013 | Shimamura et al. |

FOREIGN PATENT DOCUMENTS

| CN | 101076915 A | 11/2007 |
| EP | 1 841 001 A1 | 10/2007 |
| JP | 09-232003 | 9/1997 |
| JP | 2000100471 A | 4/2000 |
| JP | 2003249259 A | 9/2003 |
| JP | 2004253341 A | 9/2004 |
| JP | 2004327374 A | 11/2004 |
| JP | 2006210002 A | 8/2006 |
| JP | 2006302616 A | 11/2006 |
| JP | 2007-188746 | 7/2007 |
| JP | 2007257859 A | 10/2007 |
| JP | 2008097940 A | 4/2008 |
| JP | 2010-062081 | 3/2010 |

*Primary Examiner* — Jonathan G Leong
(74) *Attorney, Agent, or Firm* — Young Basile

(57) ABSTRACT

A bipolar secondary battery includes a power generating element in which a bipolar electrode and an electrolyte layer are stacked. The bipolar electrode includes a positive-electrode active material layer formed on one surface of a current collector and a negative-electrode active material layer formed on the opposing surface of the current collector. Peripheral edges of the bipolar electrode and electrolyte layer are bonded through a seal. Edges of the positive-electrode active material layer and the negative-electrode active material layer on opposite surfaces of a respective current collector are offset from each other. The edge of a seal portion facing an inner edge of the edges of the positive-electrode active material layer and the negative-electrode active material layer is positioned inside an outer edge of the edges of the positive-electrode active material layer and the negative-electrode active material layer.

19 Claims, 10 Drawing Sheets

BIPOLAR SECONDARY BATTERY WITH SEAL MEMBERS

CROSS-REFERENCE TO RELATED APPLICATIONS

This application claims priority from Japanese Patent Application Serial No. 2009-150741, filed Jun. 25, 2009, which is incorporated herein in its entirety by reference.

TECHNICAL FIELD

The present invention relates to a bipolar secondary battery and an assembled battery and a vehicle using the secondary battery.

BACKGROUND

There have been known bipolar secondary batteries each including a power generating element in which a plurality of bipolar electrodes are stacked with electrolyte layers and separators provided between the adjacent bipolar electrodes, the bipolar electrodes each including a positive-electrode active material layer formed on one of the surfaces of a current collector and a negative-electrode active material layer formed on the other surface. In other words, the bipolar secondary batteries have a structure in which the positive electrode active material layer, the electrolyte layer and the negative electrode active material layer form a unit cell layer, and a plurality of the unit cell layers are stacked with current collectors provided between adjacent unit cell layers.

In the bipolar secondary batteries, when an electrolyte containing an electrolyte solution such as a liquid electrolyte, a polymer gel electrolyte, or the like is used, a problem may occur in which the electrolyte solution leaks from one of the unit cell layers and comes in contact with the electrolyte solution of other unit cell layers, thereby causing liquid junction. In order to prevent the liquid junction, a technique of sealing each unit cell layer by disposing a seal portion to surround the periphery of each unit cell layer has been known (refer to Japanese Unexamined Patent Application Publication No. 9-232003).

BRIEF SUMMARY

In known bipolar secondary batteries, however, problems can arise when an electrode expands and contracts or thermally expands during charging and discharging of a battery. Namely, stress can be concentrated at the ends of a current collector, and thus a foil layer of a current collector can possibly be damaged, thereby decreasing durability of the battery.

In contrast, embodiments of the present invention provide a technique for relieving the stress produced in a current collector of a bipolar secondary battery.

A bipolar secondary battery according to one embodiment of the present invention includes a plurality of bipolar electrodes stacked with electrolyte layers provided between the adjacent bipolar electrodes, the bipolar electrodes each including a positive-electrode active material layer formed on one of the surfaces of a current collector and a negative-electrode active material layer formed on the other surface of the current collector. The bipolar electrodes each have a seal portion in the periphery thereof. In the bipolar secondary battery, the edges of the positive-electrode active material layer and the negative-electrode active material layer, which are opposite to each other with each current collector provided therebetween, are offset from each other. The edge of the seal portion facing one edge (referred to as an "inner edge" hereinafter) closer to the center in a planar direction among the edges of the positive-electrode active material layer and the negative-electrode active material layer, which are offset from each other, is positioned inside the other edge (referred to as an "outer edge" hereinafter) away from the center, the planar direction being perpendicular to the stacking direction of the bipolar electrodes.

In such a structure, displacement of a current collector due to stress concentration in the current collector at an electrode edge is restricted by a seal portion opposite to the electrode edge with the current collector provided therebetween, thereby relieving the stress in the current collector. Therefore, decrease in durability of a battery can be prevented.

Details of and variations in this embodiment and others are described in additional detail with reference to the drawing figures.

BRIEF DESCRIPTION OF THE DRAWINGS

The description herein makes reference to the accompanying drawings wherein like reference numerals refer to like parts throughout the several views, and wherein:

FIGS. 3A, 3B, and 3C are external views of a typical example of an assembled battery, in which FIG. 3A is a plan view of the assembled battery, FIG. 3B is a front view of the assembled battery, and FIG. 3C is a side view of the assembled battery;

DETAILED DESCRIPTION OF EMBODIMENTS OF THE INVENTION

A bipolar secondary battery according to each embodiment described below includes a power generating element in which bipolar electrodes and separators are stacked. The bipolar electrodes each include a current collector including a conductive resin layer, a positive-electrode active material layer formed on one surface of the current collector, and a negative-electrode active material layer formed on the other surface of the current collector. The peripheries of the bipolar electrodes and the separators are bonded through seal portions.

First Embodiment

Figure 1:
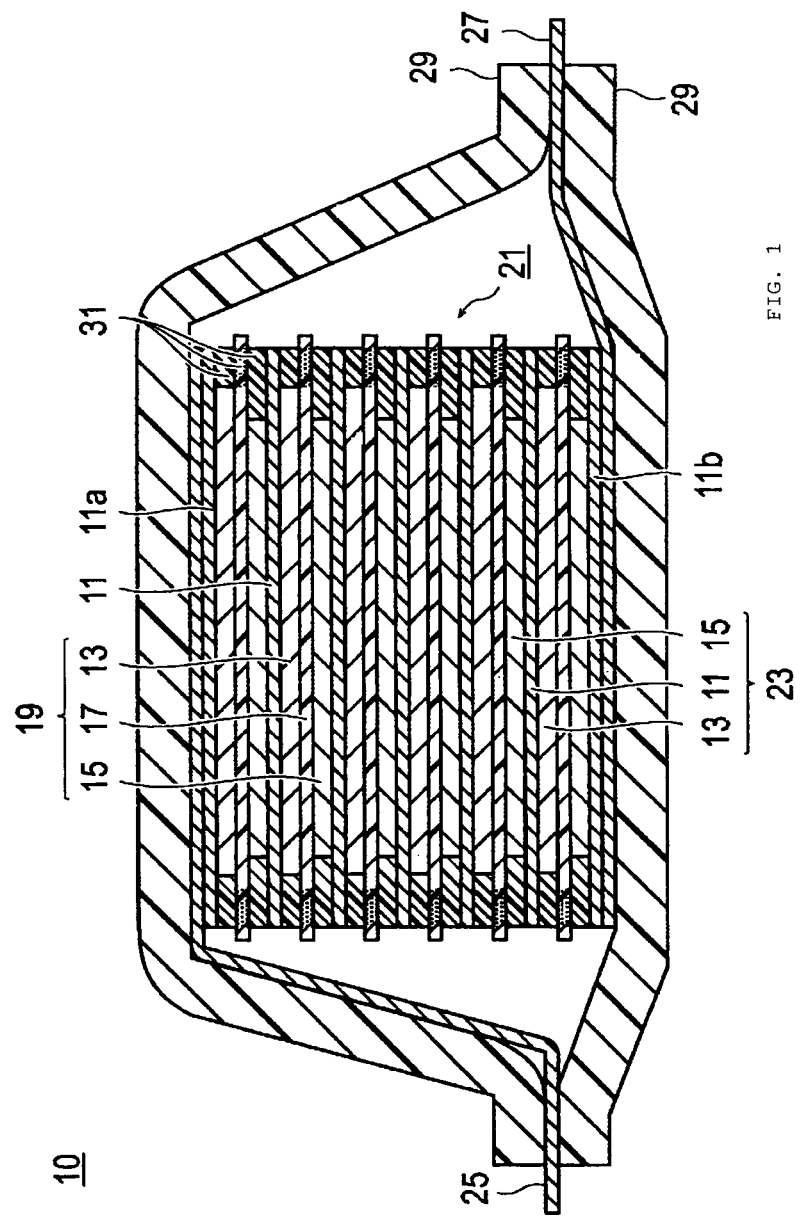
FIG. 1 is a schematic cross-sectional view showing the structure of a bipolar secondary battery according to embodiments of the present invention.

FIG. 1 is a schematic cross-sectional view showing the structure of a bipolar secondary battery 10. The bipolar secondary battery 10 shown in FIG. 1 has a structure in which a substantially rectangular power generating element 21, in which charging and discharging reactions proceed, is sealed in a laminated film 29 serving as a battery exterior material.

As shown in FIG. 1, the power generating element 21 of the bipolar secondary battery 10 includes a plurality of bipolar electrodes 23 each including a positive-electrode active material layer 13 formed on one surface of a current collector 11 and electrically connected thereto and a negative-electrode active material layer 15 formed on the other surface of the current collector 11 and electrically connected thereto. The bipolar electrodes 23 are stacked with electrolyte layers 17 provided between the adjacent bipolar electrodes 23 to form the power generating element 21.

Each of the electrolyte layers 17 includes a separator serving as a substrate and an electrolyte supported at the center of the separator in the planar direction thereof. In this case, the bipolar electrodes 23 and the electrolyte layers 17 are alternately stacked so that the positive-electrode active material layer 13 of a first one of the bipolar electrodes 23 faces, through the electrolyte layer 17, the negative-electrode active material layer 15 of another bipolar electrode 23 that is adjacent to the first bipolar electrode 23. In other words, the electrolyte layer 17 is sandwiched between the positive-electrode active material layer 13 of one bipolar electrode 23 and the negative-electrode active material layer 15 of another bipolar electrode 23 adjacent to the one bipolar electrode 23.

The positive-electrode active material layer 13, the electrolyte layer 17 and the negative-electrode active material layer 15 that are adjacent to each other constitute a unit cell layer 19. Therefore, it is also said that the bipolar secondary battery 10 includes a stack of unit cell layers 19.

The positive-electrode-side outermost current collector 11a is positioned in an outermost layer of the power generating element 21, and the positive-electrode active material layer 13 is formed on only one of the surfaces of the positive-electrode-side outermost current collector 11a. The negative-electrode-side outermost current collector 11b is positioned in the other outermost layer of the power generating element 21, and the negative-electrode active material layer 15 is formed on only one of the surfaces of the negative-electrode-side outermost current collector 11b. However, the positive-electrode active material layers 13 may be formed on both surfaces of the positive-electrode-side outermost current collector 11a. Similarly, the negative-electrode active material layers 15 may be formed on both surfaces of the negative-electrode-side outermost current collector 11b.

In the bipolar secondary battery 10 shown in FIG. 1, a positive-electrode current collector plate 25 is disposed adjacent to the positive-electrode-side outermost current collector 11a and extends to the outside of the laminate film 29 on one side. On the other hand, a negative-electrode current collector plate 27 is disposed adjacent to the negative-electrode-side outermost current collector 11b and extends to outside the laminate film 29 on another side.

Further, a seal portion (insulating portion) 31 is disposed in the periphery of each of the unit cell layers 19. The detailed arrangement method for the seal portions 31 is described later. The seal portions 31 are provided for the purpose of preventing liquid junction due to leakage of electrolyte solution from the electrolyte layers 17 and short-circuiting due to contact between the adjacent current collectors 11 in the battery 10 or due to slight irregularity of the ends of the unit cell layers 19 in the power generating element 21. Providing the seal portions 31 ensures a high-quality bipolar secondary battery 10 is provided with long-term reliability and safety.

The number of the unit cell layers 19 stacked is controlled according to the desired voltage. In addition, in the bipolar secondary battery 10, if sufficient output can be secured even with a minimum battery thickness, the number of the unit cell layers 19 stacked may be decreased. In order to prevent external impact and environmental deterioration during use, the power generating element 21 is sealed under reduced pressure in the laminate film 29, and the positive-electrode current collector plate 25 and the negative-electrode current collector plate 27 are led to outside of the laminate film 29. The main components of a bipolar secondary battery 10 are described below in additional detail.

As mentioned, bipolar electrode 23 includes a current collector 11 and an active material layer formed on a surface of the current collector 11. In more detail, the positive-electrode active material layer 13 is formed on one of the surfaces of a current collector 11, and the negative-electrode active material layer 15 is formed on the other surface. The active material layer contains a positive-electrode active material or a negative-electrode active material, and if required or desirable, contains other additives.

The current collector 11 has the function to mediate electron transfer from one of the surfaces in contact with the positive-electrode active material layer 13 to the other surface in contact with the negative-electrode active material layer 15. The current collector 11 according to this embodiment contains a conductive resin layer and, if required or desirable, contains other layers.

The resin layer functions as an electron transfer medium and contributes to weight reduction of the current collector 11. The resin layer may contain a resin substrate and, if required or desirable, contain other components such as a conductive filler and the like.

The resin substrate is composed of a non-conductive polymer material. Examples of the non-conductive polymer material include polyethylene (PE such as high-density polyethylene (HDPE), low-density polyethylene (LDPE)), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVDF), polystyrene (PS), and the like. These non-conductive polymer materials have excellent potential resistance and solvent resistance and may be used alone or as a mixture of two or more. In addition, the non-conductive polymer material may be appropriately mixed with a conductive polymer material.

In order to secure conductivity of the resin layer, a conductive filler may be added to the resin substrate according to demand. The conductive filler is not particularly limited as long as it is a material having conductivity. For example, as a material excellent in conductivity, potential resistance and/or its lithium ion cutoff property, a metal, conductive carbon, and the like may be used.

The metal is not particularly limited, but at least one metal selected from the group consisting of Ni, Ti, Al, Cu, Pt, Fe, Cr, Sn, Zn, In, Sb and K, or an alloy or metal oxide containing such a metal, is preferably used. These metals have resistance to the potential of a positive electrode or negative electrode formed on a surface of the current collector 11. For example, Al has resistance to positive-electrode potential, Ni and Cu have resistance to negative-electrode potential, and Ti and Pt have resistance to both electrode potentials. Among these, an alloy containing at least one metal selected from the group consisting of Ni, Ti, Al, Cu, Pt, Fe and Cr is more preferred.

Examples of the alloy include stainless steel (SUS) alloys, Inconel® alloys from Special Metals Corporation of New Hartford, N.Y., Hastelloy® alloys from Haynes International Inc. of Kokomo, Ind., other Fe—Cr alloys and Ni—Cr alloys, and the like. By using such an alloy, high potential resistance can be achieved.

The conductive carbon is not particularly limited, but at least one selected from the group consisting of acetylene black, Vulcan, black pearl, carbon nanofibers, Ketjenblack, carbon nanotubes, carbon nanohorns, carbon nanoballoons and fullerene is preferably used. These conductive carbons have a very wide potential window and are stable in a wide range for both the positive and negative electrode potentials, and further they have excellent conductivity. In particular, at least one selected from the group consisting of carbon nanotubes, carbon nanohorns, Ketjenblack, carbon nanoballoons and fullerene is desirably used. Since these conductive carbons have a hollow structure, they have a larger surface area per mass and thus the current collector can be further reduced in weight. The conductive fillers such as metals, conductive carbon, and the like may be used alone or in combination of two or more.

The shape of the conductive filler is not particularly limited, and a known shape such as particulate shape, fiber shape, plate-like shape, lump shape, fabric shape and mesh shape, or the like, may be appropriately selected. For example, when it is desired to impart conductivity over a wide range of a resin, particulate conductive filler is preferably used. When it is desired to further improve conductivity in a specified direction of a resin, a conductive filler having a shape with certain orientation, such as fibers or the like, is preferably used.

The size of the conductive filler is not particularly limited, and fillers of various sizes can be used according to the size and thickness of the resin layer or the shape of the conductive filler. For example, in the case of a particulate conductive filler, the average particle diameter is preferably about 0.1 μm to 10 μm from the viewpoint of ease of formation of the resin layer. In the specification, the term "particle diameter" represents the maximum distance among the distances of desired two points on the contours of the conductive filler. Average particle diameter is calculated as an average of particle diameters observed in several to several tens fields of view with an observation device such as a scanning electron microscope (SEM), a transmission electron microscope (TEM), or the like. The same definition applies to the particle diameters and average particle diameters of an active material and the like described below.

The content of the conductive filler in the resin layer is not particularly limited. In particular, when sufficient conductivity can be secured because the resin contains a conductive polymer material, the conductive filler need not necessarily be added. However, when the resin is composed of only a non-conductive polymer material, it is necessary to add the conductive filler in order to impart conductivity. In certain embodiments, the content of the conductive filler is preferably 5 to 35% by mass. In others, the content is more preferably 5 to 25% by mass or still more preferably 5 to 15% by mass. This content is based on the whole mass of the non-conductive polymer material. By adding such amounts of the conductive filler, it is possible to impart sufficient conductivity to a non-conductive polymer material while suppressing an increase in mass of the resin layer.

The dispersion state of the conductive filler in the resin layer is not particularly limited, and the conductive filler may be uniformly dispersed in the resin layer serving as the substrate or locally dispersed in a portion of the resin layer. When it is desired to uniformly impart conductivity over the whole resin layer, the conductive filler is preferably uniformly dispersed over the whole resin.

The thickness of each conductive resin layer is preferably 1 to 200 μm in certain embodiments. In others, values of 10 to 100 μm, or more preferably 10 to 50 μm, can be used. When the thickness of each resin layer is within such ranges in the embodiments, resistance in the thickness direction can be sufficiently suppressed to a low level. It is thus possible to secure conductivity of the current collector 11 and increase the power density of the battery by reducing the weight. Further, it is possible to improve the life by decreasing the possibility of liquid junction and to improve vibration resistance.

The form of the current collector 11 is not particularly limited as long as it contains the conductive resin layer and any one of various forms can be used. For example, the form of the current collector 11 may be a stack including the resin layer and another layer according to demand. Examples of a layer other than the resin layer include, but are not limited to, a metal layer, an adhesive layer, and the like. For example, the current collector 11 may include a single conductive resin layer or may be a stacked form including two or more conductive resin layers. In a stack of a plurality of resin layers, if micro cracks occur in each of the resin layers, liquid junction can be prevented because the positions of the cracks deviate from each other. In addition, a metal layer composed of aluminum, nickel, copper or an alloy containing such a metal may be disposed between the resin layers. By disposing such a metal layer, liquid junction between the positive-electrode active material layer and the negative-electrode active material layer in the bipolar electrode due to ion permeation in the resin layer can be prevented, thereby forming a bipolar secondary battery 10 having an extended life and excellent long-term reliability.

To stack the resin layer and the metal layer, a method of evaporating a metal on the resin layer, a method of fusion-bonding a resin to a metal foil, or the like can be used. In addition, when the current collector 11 includes two or more stacked resin layers or metal layers, two layers may be bonded with an adhesive layer to decrease the contact resistance at an interface between layers and preventing separation at a bonded surface. A metal oxide-based conductive paste containing zinc oxide, indium oxide, titanium oxide, or the like, or a carbon-based conductive paste containing carbon black, carbon nanotubes, graphite, or the like, can be used for the adhesive layer.

The thickness of the current collector 11 is preferably as small as possible in order to increase the power density of a battery by reducing its weight. In the bipolar secondary battery 10, the current collector 11 present between the positive-electrode active material layer 13 and the negative-electrode active material layer 15 of the bipolar electrode 23 may have high electric resistance in a direction parallel to the stacking direction, and thus the thickness of the current collector 11 can be decreased. Specifically, the thickness of the current collector 11 in this embodiment is preferably 1 to 200 μm, more preferably 5 to 150 μm, and still more preferably 10 to 100 μm. Although other thicknesses are possible, with such a thickness, a battery having excellent output properties and long-term reliability can be formed.

The positive-electrode active material layer 13 contains a positive-electrode active material that occludes ions during discharging and releases ions during charging. A preferred example is a lithium-transition metal compound oxide, which is a compound oxide of transition metal and lithium. Examples of such a lithium-transition metal compound oxide include Li—Co compound oxides such as $LiCoO_2$ and the like, Li—Ni compound oxides such as $LiNiO_2$ and the like, Li—Mn compound oxides such as spinel $LiMn_2O_4$ and the like, Li—Fe compound oxides such as $LiFeO_2$ and the like, compound oxides in which transition metal is partially substituted by another element, and the like. These lithium-transition metal compound oxides are excellent in reactivity and cycle properties and are low-cost materials. Therefore, by using such a material for an electrode, a battery having excellent output properties can be formed. Other examples that can be used as the positive-electrode active material include phosphate compounds and sulfate compounds of transition metal and lithium, such as $LiFePO_4$ and the like; transition metal oxides and sulfides, such as $V_2O_5$, $MnO_2$, $TiS_2$, $MoS_2$, $MoS_3$, and the like; $PbO_2$; AgO; NiOOH; and the like. These positive-electrode active materials may be used alone or in the form of a mixture of two or more.

The average particle diameter of the positive-electrode active material is not particularly limited but is, in the embodiments described herein, preferably 1 to 100 μm and more preferably 1 to 20 μm for higher capacity, reactivity and cycle durability of the positive-electrode active material. Within this range, an increase in the internal resistance of a secondary battery during charging and discharging under high output conditions can be suppressed, thereby producing a sufficient current. When the positive-electrode active material is composed of secondary particles, the average particle diameter of primary particles constituting the secondary particles is preferably in a range of 10 nm to 1 μm. However, the average particle diameter is not necessarily limited to this range. Of course, the positive-electrode active material is not necessarily composed of secondary particles produced by aggregation, agglomeration, or the like depending on the production method used. As the particle diameter of the positive-electrode active material and the particle diameter of primary particles, a median diameter determined by a laser diffraction method can be used. In addition, the possible shape of the positive-electrode active material varies according to the type, the production method, and the like. For example, a spherical shape (powder), a plate-like shape, a needle-like shape, a columnar shape or an angular shape can be used. The shape is not limited to these, and any shape can be used without problems. However, it is preferred to appropriately select an optimum shape capable of improving battery characteristics such as charging/discharging characteristics.

The negative-electrode active material layer 15 contains a negative-electrode active material that releases ions during discharging and occludes ions during charging. The negative-electrode active material is not particularly limited as long as lithium can be reversibly occluded and released. Preferred examples of the negative-electrode active material include metals such as Si, Sn, and the like; metal oxides such as TiO, $Ti_2O_3$, $TiO_2$, $SiO_2$, SiO, $SnO_2$, and the like; lithium-transition metal compound oxides such as $Li_{4/3}Ti_{5/3}O_4$, $Li_7MnN$, and the like; Li—Pb alloys; Li—Al alloys; Li; and carbon materials such as natural graphite, artificial graphite, carbon black, activated carbon, carbon fibers, cokes, soft carbon, hard carbon, and the like. The negative-electrode active material preferably contains an element alloyed with lithium. By using an element alloyed with lithium, it is possible to produce a battery having a high energy density, high capacity and excellent output characteristics as compared with conventional carbon-based materials. The above-described negative-electrode active materials may be used alone or in the form of a mixture of two or more.

Examples of an element alloyed with lithium include, but are not limited to, Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, Cl, and the like. Among these, a carbon material and/or at least one element selected from the group consisting of Si, Ge, Sn, Pb, Al, In, and Zn is preferably used, and, in particular, a carbon material and an element of Si or Sn are preferably used in the embodiments described herein. These elements may be used alone or in combination of two or more.

The average particle diameter of the negative-electrode active material is not particularly limited but in these embodiments is preferably 1 to 100 μm and more preferably 1 to 20 μm from the viewpoint of higher capacity, reactivity and cycle durability of the negative-electrode active material. Within such ranges, an increase in the internal resistance of a secondary battery during charging and discharging under high output conditions can be suppressed, thereby producing a sufficient current. When the negative-electrode active material is composed of secondary particles, the average particle diameter of primary particles constituting the secondary particles in certain embodiments is preferably in a range of 10 nm to 1 μm. The average particle diameter is not necessarily limited to this range. Of course, the negative-electrode active material is not necessarily composed of secondary particles produced by aggregation, agglomeration, or the like depending on the production method used. As the particle diameter of the negative-electrode active material and the particle diameter of primary particles, a median diameter determined by a laser diffraction method can be used. In addition, the possible shape of the negative-electrode active material varies according to the type, the production method, and the like. For example, a spherical shape (powder), a plate-like shape, a needle-like shape, a columnar shape or an angular shape can be used. The shape is not limited to these, and any shape can be used without problems. It is preferred, however, to appropriately select an optimum shape capable of improving battery characteristics such as charging/discharging characteristics.

If required, the active material layer may contain other materials. For example, a conductive assistant, a binder, and the like may be added. When an ionic conductive polymer is included, a polymerization initiator may also be included for polymerization for the polymer.

The conductive assistant is an additive to be added for improving conductivity of the active material layer. Examples of the conductive assistant include carbon powders such as acetylene black, carbon black, Ketjenblack, graphite, and the like; various carbon fibers such as vapor-grown carbon fibers (VGCF® from Show Denko KK, Tokyo, Japan), and the like; and expanded graphite. The conductive assistant is not limited to these materials.

Examples of the binder include polyvinylidene fluoride (PVDF), polyimide (PI), PTFE, SBR, synthetic rubber binders, and the like. The binder is not limited to these materials. When the binder is the same as a matrix polymer used as a gel electrolyte, the binder is not required.

The mixing ratio of the components contained in the active material layer is not particularly limited. The mixing ratio can be controlled as appropriate according one having skill in the art of bipolar secondary batteries. Also, the thickness of the active material layer is not particularly limited, and the thickness can be controlled as appropriate according one having skill in the art of bipolar secondary batteries. For example, the thickness of the active material layer in this embodiment is preferably about 10 to 100 μm and more preferably 20 to 50 μm. When the thickness of the active material layer is about 10 μm or more, a desired battery capacity can be sufficiently secured.

The method for forming the positive-electrode active material layer 13 (or the negative-electrode active material layer 15) on a surface of the current collector 11 is not particularly limited, and any known method can be used. For example, as described above, the positive-electrode active material (or the negative-electrode active material), and if required, an electrolyte salt for enhancing ionic conductivity, the conductive assistant for enhancing electron conductivity, and the binder are dispersed or dissolved in a proper solvent to prepare a positive-electrode active material slurry (or negative-electrode active material slurry). The slurry is applied to the current collector 11, dried to remove the solvent, and then pressed to form the positive-electrode active material layer 13 (or the negative-electrode active material layer 15) on the current collector 11. Examples of an appropriate solvent include, but are not limited to, N-methyl-2-pyrrolidone (NMP), dimethylformamide, dimethylacetamide, methylformamide, cyclohexane, hexane, and the like. When polyvinylidene fluoride (PVDF) is used as the binder, NMP is preferably used as the solvent.

Where the positive-electrode active material slurry (or negative-electrode active material slurry) is applied to the current collector, dried, and then pressed, the porosity of the resulting positive-electrode active material layer (or negative-electrode active material layer) can be controlled by controlling the pressing conditions.

The specified method and conditions for pressing are not particularly limited and are appropriately controlled so that the porosity of the positive-electrode active material slurry (or negative-electrode active material slurry) after pressing is a desired value. The pressing mode can use, for example, a hot pressing machine, a calendar roll pressing machine, or the like. Also, the pressing conditions (temperature, pressure, etc.) are not particularly limited, and can be selected according to techniques known by one having skill in the art of making bipolar secondary batteries in order to obtain a desired layer.

The electrolyte layer is a medium for transferring lithium ion between electrodes. In this embodiment, an electrolyte constituting the electrolyte layer is not particularly limited as long as it contains a supporting electrolyte as an electrolyte solution and a medium. A known liquid electrolyte and polymer gel electrolyte can be appropriately used.

The liquid electrolyte contains a lithium salt as the supporting electrolyte dissolved in a solvent. Examples of the solvent include dimethyl carbonate (DMC), diethyl carbonate (DEC), dipropyl carbonate (DPC), ethylmethyl carbonate (EMC), methyl propionate (MP), methyl acetate (MA), methyl formate (MF), 4-methyldioxolane (4MeDOL), dioxolane (DOL), 2-methyltetrahydrofuran (2MeTHF), tetrahydrofuran (THF), dimethoxyethane (DME), ethylene carbonate (EC), propylene carbonate (PC), butylene carbonate (BC), γ-butyrolactone (GBL), and the like. These solvents may be used alone or as a mixture of two or more.

In addition, examples of the supporting electrolyte (lithium salt) include, but are not particularly limited to, inorganic acid anion salts such as $LiPF_6$, $LiBF_4$, $LiClO_4$, $LiAsF_6$, $LiTaF_6$, $LiSbF_6$, $LiAlCl_4$, $Li_2B_{10}Cl_{10}$, LiI, LiBr, LiCl, $LiAlCl$, $LiHF_2$, LiSCN, and the like; organic acid anion salts such as $LiCF_3SO_3$, $Li(CF_3SO_2)_2N$, LiBOB (lithium bisoxide borate), LiBETI (lithium bis(perfluoroethylenesulfonyl)imide) represented by $Li(C_2F_5SO_2)_2N$, and the like. These electrolyte salts may be used alone or as a mixture of two or more.

On the other hand, the polymer gel electrolyte is composed of the liquid electrolyte injected into a matrix polymer having lithium ionic conductivity. Examples of the matrix polymer having lithium ionic conductivity include polymers (PEO) having polyethylene oxide in a main chain or side chain, polyethylene glycol (PEG), polyacrylonitrile (PAN), polymethacrylate, polyvinylidene fluoride (PVDF), copolymers of polyvinylidene fluoride and hexafluoropropylene (PVDF-HFP), polyacrylonitrile (PAN), poly(methyl acrylate) (PMA), poly(methyl methacrylate) (PMMA), and the like. In addition, mixtures, modified products, derivatives, random copolymers, alternating copolymers, graft copolymers, block copolymers, or the like of these polymers can be used. Among these polymers, PEO, PPO and a copolymer thereof, PVDF, and PVDF-HFP are preferably used. The electrolyte salt such as lithium salt or the like can be sufficiently dissolved in these matrix polymers. The matrix polymers exhibit excellent mechanical strength when forming cross-linked structures.

The bipolar secondary battery according to this embodiment includes an electrolyte layer composed of a liquid electrolyte or polymer gel electrolyte, and thus a separator is preferably used for the electrolyte layer to support the electrolyte solution. The form of the separator is not particularly limited and may be a porous film having many fine pores, a nonwoven fabric, or a laminate thereof. A composite resin film including a polyolefin resin nonwoven fabric or polyolefin resin porous film used as a reinforcing material layer and a vinylidene fluoride resin compound filled in the reinforcing material layer can also be used.

As the material constituting the seal portions 31, any material may be used as long as it has an insulation property, a sealing property against leaking of a solid electrolyte, a sealing property for moisture permeation from the outside, heat resistance at a battery operating temperature, and the like. Examples of materials that can be used include urethane resins, epoxy resins, polyethylene resins, polypropylene resins, polyimide resins, rubber, and the like. Among these resins, polyethylene resins and polypropylene resins are preferably but not necessarily used as the constituent material of the insulating portions 31 from the viewpoint of corrosion resistance, chemical resistance, ease of formation (film forming properties), economy, and the like.

Figure 2:
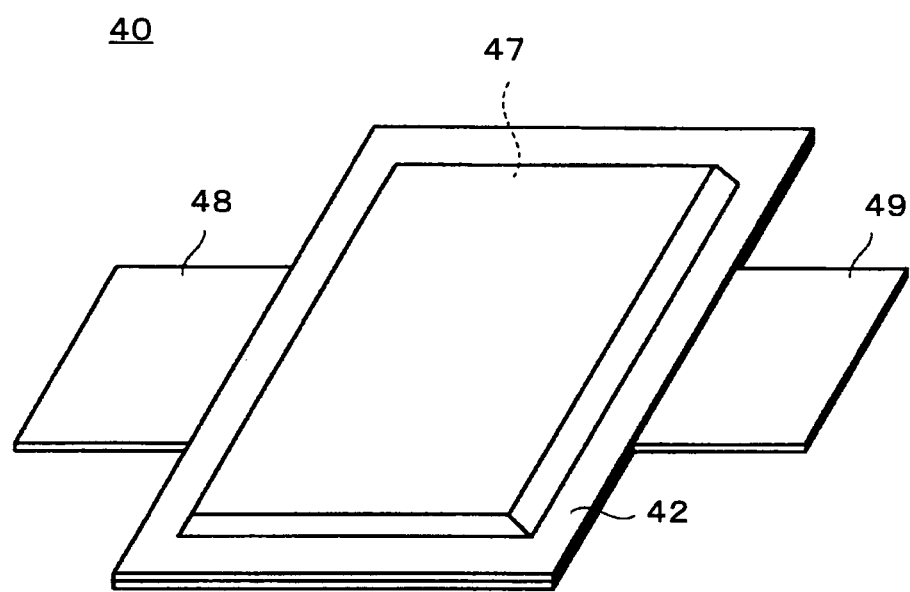
FIG. 2 is a perspective view of a laminated bipolar secondary battery as a typical example of bipolar batteries.

FIG. 2 is a perspective view of a stacked-type flat or laminated bipolar secondary battery 40 as a typical example of bipolar batteries.

As shown in FIG. 2, the secondary battery 40 has a rectangular flat shape in which a positive-electrode tab 48 and a negative-electrode tab 49 are led out from opposite sides in order to extract electric power. A power generating element (battery element) 47 is covered with a battery exterior material 42 to form the secondary battery 40. The periphery of the battery exterior material 42 is heat-sealed to seal the power generating element 47 with the positive-electrode tab 48 and the negative-electrode tab 49 led to the outside. The power generating element 47 corresponds to the power generating element (battery element) 21 of the above-described bipolar secondary battery 10 shown in FIG. 1 and includes a stack of a plurality of unit cells 19, each including the positive electrode (positive-electrode active material layer) 13, the electrolyte layer 17, and the negative electrode (negative-electrode active material layer) 15.

The arrangement of the tabs 48 and 49 shown in FIG. 2 is not particularly limited, and the positive-electrode tab 48 and the negative-electrode tab 49 may be led out from the same side or may be divided into a plurality of parts and led out from their respective sides. Therefore, the arrangement is not limited to that shown in FIG. 2.

The secondary battery 40 can be preferably used as a large-capacity power supply for electric cars, hybrid electric cars, fuel-cell cars, hybrid fuel-cell cars, and the like, i.e., as a vehicle-driving power supply and auxiliary power supply that are required to have high volumetric energy density and high volumetric power density.

An assembled battery includes a plurality of bipolar batteries connected to each other. In detail, at least two bipolar batteries are used and arranged in series or parallel or in both series and parallel. By arranging the bipolar batteries in series and/or in parallel, the capacity and voltage can be freely controlled.

Figure 3A:
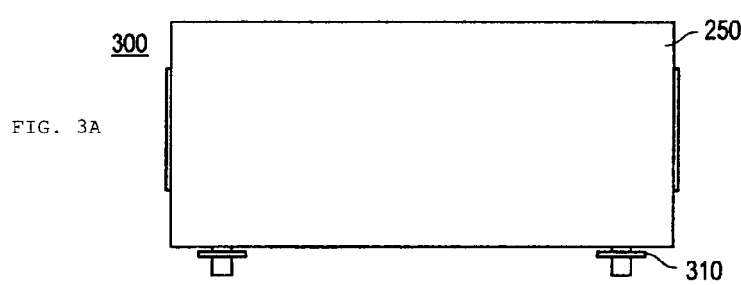
Figure 3B:
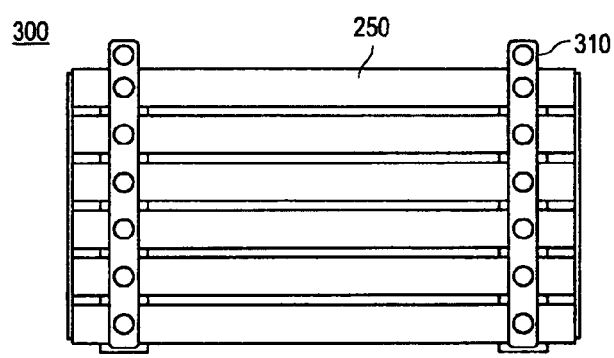
Figure 3C:
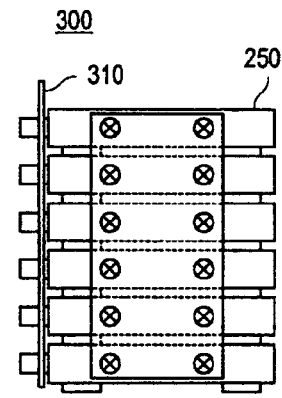

FIGS. 3A, 3B and 3C are external views of a typical example of an assembled battery, in which FIG. 3A is a plan view of the assembled battery, FIG. 3B is a front view of the assembled battery, and FIG. 3C is a side view of the assembled battery.

As shown in FIGS. 3A to 3C, an assembled battery 300 includes a plurality of detachable small assembled batteries 250 each formed by connecting a plurality of bipolar batteries in series and/or in parallel. The plurality of detachable small assembled batteries 250 are connected in series and/or in parallel to form the assembled battery 300 having large capacity and large output and being suitable for a vehicle-driving power supply and an auxiliary power supply that are required to have high volumetric energy density and high volumetric power density. The formed detachable small assembled batteries 250 are connected to each other using an electric device such as a bus bar and are stacked using a connection jig 310. The number of the bipolar batteries connected to form each assembled battery 250 and the number of the assembled batteries 250 stacked to form the assembled battery 300 are generally determined according to the battery capacity and output of a vehicle (electric car) on which the assembled battery 300 is mounted.

Figure 4:
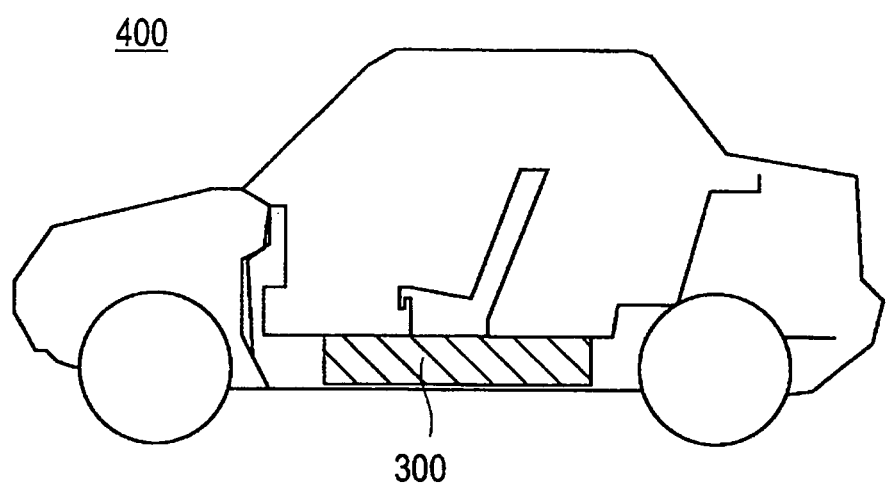
FIG. 4 is a conceptual view of a vehicle on which an assembled battery is mounted.

FIG. 4 is a conceptual view of a vehicle on which the assembled battery 300 is mounted. Since the assembled battery 300 has excellent long-term reliability and output characteristics and a long life, a plug-in hybrid electric car having a long EV travel distance and an electric car having a long travel distance per charge can be formed. In other words, when the bipolar battery or the assembled battery 300 including a plurality of the bipolar batteries is used with, for example, automobiles such as a hybrid car, a fuel-cell car and an electric car (each including four-wheel cars such as passenger cars, trucks, commercial cars such as a bus and the like, light cars, and the like, two-wheeled vehicles such as a bike, and three-wheeled vehicles), automobiles with long life and high reliability are produced. However, application of the assembled battery 300 is not limited to automobiles, and such a battery can be applied to, for example, various power supplies of movable bodies such as other vehicles, trains, and the like, and can be used as a mounting power supply for an uninterruptible power supply and the like.

When the assembled battery 300 is mounted on a vehicle such as an electric car 400, the assembled battery 300 can be mounted below a seat in a central portion of the vehicle body of the electric car 400 as shown in FIG. 4. This is because a wide space in the vehicle passenger compartment and a wide trunk room can be formed by mounting below the seat. A place on which the assembled battery 300 is mounted is not limited to a place below a seat, and the assembled battery 300 may be mounted below a rear trunk room or in a front engine room of a vehicle. The electric car 400 using the assembled battery 300 has high durability and can provide sufficiently high output even after long-term use. Further, an electric car and hybrid car with excellent running performance can be provided.

Figure 5A:
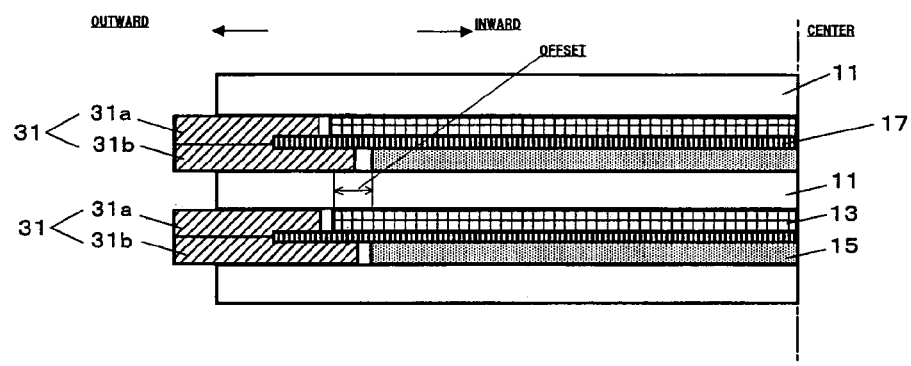
FIG. 5A is a partial cross-sectional view showing an arrangement of seal members of a bipolar secondary battery according to a first embodiment of the present invention.
Figure 5B:
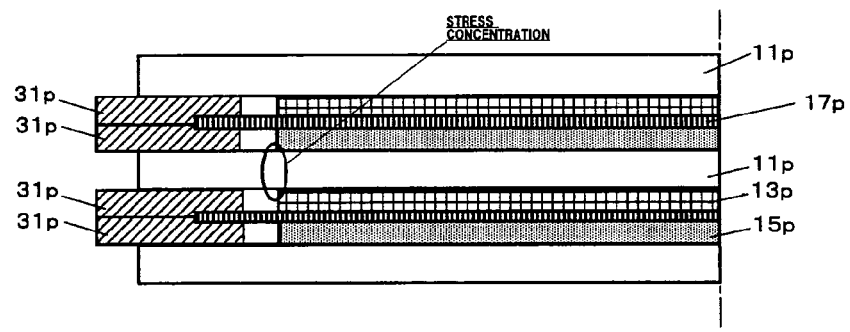
FIG. 5B is a partial cross-sectional view showing an arrangement of seal members of a bipolar secondary battery without the present invention.

The bipolar secondary battery according to the first embodiment is characterized by an arrangement of the seal portions 31 as described with reference to FIGS. 5A and 5B. FIG. 5A is a partial cross-sectional view showing an arrangement of the seal portions 31 of the bipolar secondary battery according to the first embodiment of the present invention, and FIG. 5B is a partial cross-sectional view showing an arrangement of seal portions of a bipolar secondary battery without the present invention. In FIG. 5B, a component corresponding to each of the components shown in FIG. 5A is shown by adding character "p" to the reference numeral in FIG. 5A.

In an example shown in FIG. 5A, the seal members 31 are disposed between the immediately adjacent current collectors 11 in the peripheries of the current collectors 11 in order to prevent contact between the adjacent current collectors 11. The seal portion of each seal member 31 laminated on the same surface as each of the positive-electrode active material layers 13 so as to face the positive-electrode active material layer 13 is referred to as the "seal portion 31a." In addition, the seal portion of each seal member 31 laminated on the same surface as each of the negative-electrode active material layers 15 so as to face the negative-electrode active material layer 15 is referred to as the "seal portion 31b." That is, each seal member 31 includes a positive-electrode active material layer facing seal portion 31a and a negative-electrode active material layer facing seal portion 31b. Therefore, each of the electrolyte layers 17 is sandwiched between the seal portions 31a and 31b.

In the bipolar secondary battery according to the first embodiment, the area of the positive-electrode active material layers 13 is larger than that of the negative-electrode active material layers 15, and thus the edges of the positive-electrode active material layers 13 and the negative-electrode active material layers 15 are not uniform. Specifically, the outer edge of each of the positive-electrode active material layers 13 is positioned further away from the center in a planar direction (outside, the left side in FIG. 5A) than the negative-electrode active material layer 15 opposite to the positive-electrode active material layer 13 with each current collector 11 provided therebetween in the stacking direction. The planar direction is thus perpendicular to the stacking direction of the bipolar electrodes 23. In addition, the edge of a seal portion 31b facing the edge of each of the negative-electrode active material layers 15 is positioned closer to the center in the planar direction (inside, the right side in FIG. 5A) than the edge of the positive-electrode active material layer 13 opposite to the negative-electrode active material layer 15 with each current collector 11 provided therebetween in the stacking direction.

If the positive-electrode active material layers 13 and the negative-electrode active material layers 15 are thinner than the seal portions 31a and 31b, the seal portions 31a and 31b are first subject to forces in the stacking direction, and thus the weight distribution ratio of the positive-electrode active material layers 13 and the negative-electrode active material layers 15 is decreased. If the positive-electrode active material layers 13 and the negative-electrode active material layers 15 are subject to low force, the surface pressure is also decreased, thereby increasing the contact resistance between the positive- and negative-electrode active material layers 13 and 15 and the current collectors 11. Therefore, in order to decrease the contact resistance between the positive- and negative-electrode active material layers 13 and 15 and the current collectors 11, the thickness of the positive-electrode active material layers 13 and the negative-electrode active material layers 15 is increased relative to the thickness of the seal portions 31a and 31b. Particularly when the positive-electrode active material layers 13 and the negative-electrode active material layers 15 expand or contract, stress is easily generated in the current collectors 11 at the edges of the positive-electrode active material layers 13 and the negative-electrode active material layers 15.

However, in the bipolar secondary battery according to the first embodiment, for example, even when the positive-electrode active material layers 13 expand, stress can be relieved by restricting displacement of the current collectors 11 because the negative-electrode active material layer facing seal portion 31b is present opposite to the positive-electrode active material layer 13 with the current collector 11 formed therebetween along an extension of the edge of the positive-electrode active material layer 13. In addition, when the negative-electrode active material layers 15 expand, stress can be relieved by restricting displacement of the current collectors 11 because the positive-electrode active material layer 13 is present opposite to the negative-electrode active material layer 15 with each current collector 11 formed therebetween along the edge of the negative-electrode active material layer 15.

On the other hand, in a bipolar secondary battery such as shown in FIG. 5B, the edges of the positive-electrode active material layers 13p and the negative-electrode active material layers 15p are uniform. In this case, stress occurs in the current collectors 11p at the edges of the electrodes due to thermal expansion or thermal contraction of the electrodes, possibly decreasing durability of the battery. In addition, even when the bipolar secondary battery has a structure in which the edges of the positive-electrode active material layers 13p and the negative-electrode active material layers 15p are not uniform, the outer edge among their edges is opposite to a vacant space with the current collector 11p therebetween on an extension of the outer edge. Therefore, when the electrodes expand or contract, displacement of the current collectors 11p is not restricted, and thus durability of the battery is possibly decreased.

EXAMPLES

The operation and advantage of the present invention are described with reference to examples below. However, the technical scope of the present invention is not limited to these examples.

First, $LiMn_2O_4$ as a positive-electrode active material, acetylene black (AB) as a conductive assistant, polyvinylidene fluoride (PVDF) as a binder and N-methylpyrrolidone (NMP) as a viscosity adjusting solvent were mixed to prepare a positive-electrode active material slurry. The mixing ratio of the components was $LiMn_2O_4$:AB:PVDF=85:5:10 (ratio by mass).

In addition, hard carbon as a negative-electrode active material, acetylene black (AB) as a conductive assistant, polyvinylidene fluoride (PVDF) as a binder and N-methylpyrrolidone (NMP) as a viscosity adjusting solvent were mixed to prepare a negative-electrode active material slurry. The mixing ratio of the components was hard carbon:AB:PVDF=85:5:10 (ratio by mass).

A current collector was formed by mixing a resin material such as polyethylene, polyimide, or the like as a substrate and a conductive assistant such as acetylene black or the like and then extrusion-molding the resultant mixture to form a thin film.

The prepared positive-electrode active material slurry was applied to one of the surfaces of the current collector 11 and then dried to form a positive-electrode active material layer 13. In addition, the negative-electrode active material slurry was applied to the other surface of the current collector and then dried to form a negative-electrode active material layer 15. As a result, a bipolar electrode 23 is made including the positive-electrode active material layer 13 formed on one of the surfaces of the current collector 11 and the negative-electrode active material layer 15 formed on the other surface of the current collector 11.

The resultant bipolar electrodes 23, seal members 31 and separators were stacked as shown in FIG. 5A, and the current collectors 11, seal members 31 and separators were heat-sealed by pressing (0.2 MPa, 200° C., 5 seconds) the three sides of the periphery in the vertical direction. For the seal members 31, a polyethylene thermoplastic resin was used.

A solution was prepared as an electrolyte solution by dissolving $LiPF_6$ as a lithium salt at a concentration of 1.0 M in a mixed solvent containing propylene carbonate (PC) and ethylene carbonate (EC) at 1:1 (volume ratio). Then, the electrolyte solution was injected from the remaining unsealed side of the bipolar secondary battery structure so as to be supported by the separators disposed between the bipolar electrodes 23 to form electrolyte layers. The remaining unsealed side was sealed by pressing under the same conditions as described above.

Strong electric terminals, each including an aluminum plate that can cover a projected surface of the bipolar battery element and that has a portion projecting outward from the projected surface of the battery, were formed. The bipolar battery element was sandwiched between the strong electric terminals, and these members were covered with an aluminum laminated film and vacuum-sealed. The whole of the bipolar battery element was pressurized by pressing at atmospheric pressure from both sides thereof to complete a gel electrolyte-type bipolar secondary battery having improved contact between the strong electric terminals and the battery element.

The bipolar secondary battery formed by the above-described method was charged to 4.2 V by a constant-current method (CC, current: 0.5 C) in an atmosphere of 25° C. After stoppage for 10 minutes, discharging was performed to 2.5 V by a constant-current method (CC, current: 0.5 C) and then stopped for 10 minutes. This charging/discharging process was regarded as one cycle, and a charging/discharging test was conducted by 50 cycles. In the bipolar secondary battery according to the first embodiment shown in FIG. 5A, stress generated in the current collectors can be relieved as described above. Therefore, a battery voltage was maintained even after 50 cycles of charging and discharging, and good cycle properties were exhibited.

As described above, the bipolar secondary battery according to the first embodiment includes the power generating element 21 formed by stacking the bipolar electrodes 23 and the electrolyte layers 17, the bipolar electrodes 23 each including the positive-electrode active material layer 13 formed on one of the surfaces of the current collector 11 and the negative-electrode active material layer 15 formed on the other surface of the current collector 11. The peripheral portions of the bipolar electrodes 23 and the electrolyte layers 17 are bonded together through the seal members 31.

In this bipolar secondary battery, the edges of the positive-electrode active material layers 13 and the negative-electrode active material layers 15 on opposite surfaces of a respective current collector 11 are offset from each other. Among the edges of the positive-electrode active material layers 13 and the negative-electrode active material layers 15, which are offset from each other, a negative-electrode active material layer facing seal portion 31b is positioned inside the outer edge of each of the positive-electrode active material layers 13. In this configuration, even when the positive-electrode active material layers 13 and/or the negative-electrode active material layers 15 expand or contract, stress can be relieved by restricting displacement of the current collectors 11 because the seal portion 31b is present opposite to each of the positive-electrode active material layers 13 with the current collector 11 formed therebetween.

Second Embodiment

Figure 6:
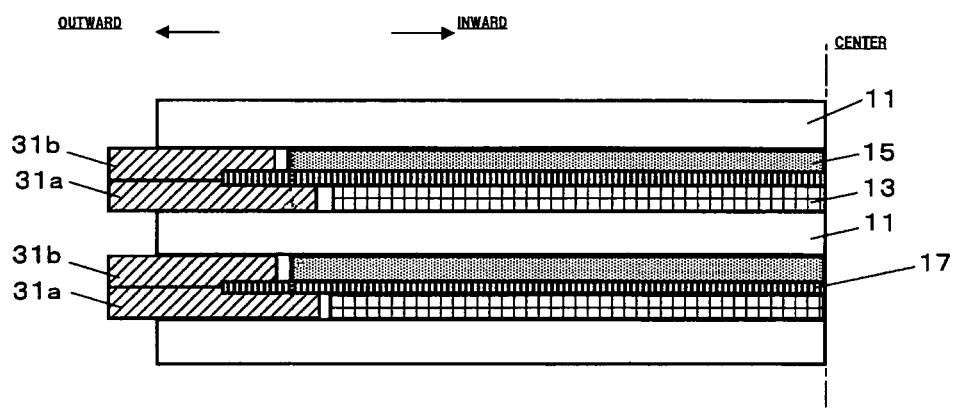
FIG. 6 is a partial cross-sectional view showing an arrangement of seal members of a bipolar secondary battery according to a second embodiment of the present invention.

FIG. 6 is a partial cross-sectional view showing an arrangement of seal members 31 of a bipolar secondary battery according to a second embodiment of the present invention. In this embodiment, the area of negative-electrode active material layers 15 is larger than that of positive-electrode active material layers 13, and the edges of each negative-electrode active material layer 15 are positioned outside the edges of the positive-electrode active material layer 13 on an opposite side of the adjacent current collector 11. In addition, the inner edges of the positive-electrode active material layer facing seal portions 31a are positioned inside the edges of the negative-electrode active material layers 15 on an opposite side of the adjacent current collector 11 in the stacking direction.

During charging/discharging of the battery, expansion and contraction of a negative electrode tend to be larger than those of a positive electrode. In the bipolar secondary battery according to the second embodiment, a seal portion 31a is present opposite to each of the outer edges of the negative-electrode active material layers 13, with the current collectors 11 provided between the adjacent seal portion 31a and outer edge. Thus stress can be relieved by restricting displacement of the current collectors 11 at the edges of the negative-electrode active material layers 15, which generally expand and contract more than the positive-electrode active material layer 13. Even when the positive-electrode active material layers 13 expand, the negative-electrode active material layers 15 are present on opposite sides of a respective current collector 11, and thus stress can be relieved by restricting displacement of the current collectors 11.

The above-described 50-cycle charging/discharging test was performed for the bipolar secondary battery according to the second embodiment. A battery voltage was maintained even after 50 cycles of charging and discharging, and good cycle characteristics were exhibited.

Third Embodiment

Figure 7:
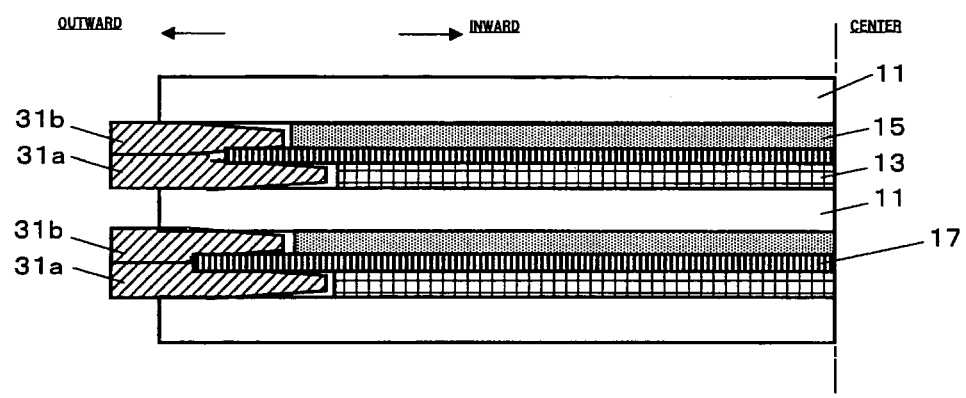
FIG. 7 is a partial cross-sectional view showing an arrangement of seal members of a bipolar secondary battery according to a third embodiment of the present invention.

FIG. 7 is a partial cross-sectional view showing an arrangement of seal members 31 of a bipolar secondary battery according to a third embodiment of the present invention. Like in the second embodiment, the edges of the positive-electrode active material layer facing seal portions 31a are positioned inside the edges of the negative-electrode active material layers 15, which are opposite to the positive-electrode active material layers 13 with the current collectors 11 provided between the positive- and negative-electrode active material layers 13 and 15 in the stacking direction. Therefore, displacement of the current collectors 11 at the edges of the negative-electrode active materials layers 15, which generally expand and contract more than the positive-electrode active material layers 13, can be restricted.

In addition, as shown in FIG. 7, the thickness of the inner portions of the seal portions 31a and 31b is smaller than that on the outer portions, i.e., the thickness is smaller on the side close to the positive-electrode active material layers 13 and the negative-electrode active material layers 15. In particular, the thickness of the seal portions 31a and 31b decreases as it approaches the positive-electrode active material layers 13 and the negative-electrode active material layers 15. Therefore, when the positive-electrode active material layers 13 and the negative-electrode active material layers 15 expand or contract, expansion or contraction of the positive-electrode active material layers 13 and the negative-electrode active material layers 15 is absorbed in the thinner regions of the seal portions 31a and 31b, and thus stress concentration in the current collectors 11 can be relieved. Note that although the seal portions 31a and 31b have a generally tapered shape in FIG. 7, it is also possible that seal portions have a reduced but constant thickness for a portion of their length.

The above-described 50-cycle charging/discharging test was performed for the bipolar secondary battery according to the third embodiment. As a result, a battery voltage was maintained even after 50 cycles of charging and discharging, and good cycle characteristics were exhibited.

In addition, this configuration may be applied to a structure in which the area of the positive-electrode active material layers 13 is larger than that of the negative-electrode active material layers 15, and the edges of each positive-electrode active material layers 13 are positioned outside the edges of a respective negative-electrode active material layer 15 on an opposite side of the adjacent current collector 11 in the stacking direction. In other words, a configuration may be used in which the thickness of the inner portions of the seal portions 31a and 31b is smaller than that on the outer portions, i.e., the thickness is smaller on the side close to the positive-electrode active material layers 13 and the negative-electrode active material layers 15.

Fourth Embodiment

Figure 8:
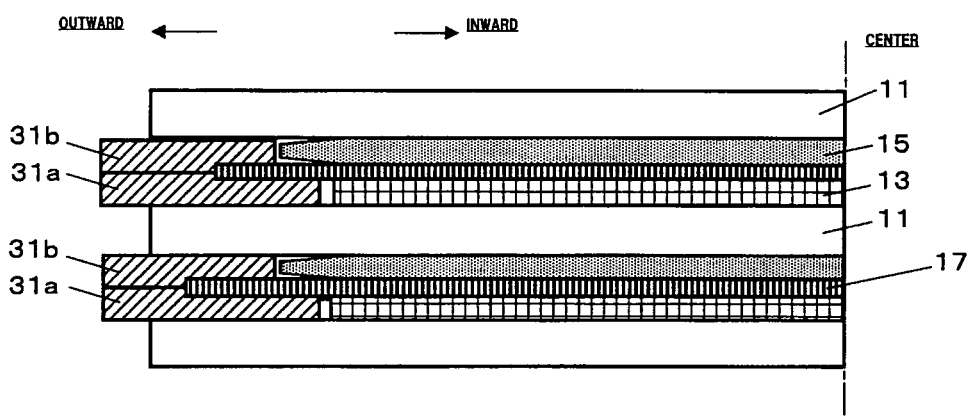
FIG. 8 is a partial cross-sectional view showing an arrangement of seal members of a bipolar secondary battery according to a fourth embodiment of the present invention.

FIG. 8 is a partial cross-sectional view showing an arrangement of seal members 31 of a bipolar secondary battery according to a fourth embodiment of the present invention. Like in the second embodiment, the edges of the positive-electrode active material layer facing seal portions 31a are positioned inside the edges of the negative-electrode active material layers 15, which are on opposite sides of a respective current collector 11 from the positive-electrode active material layers 13 in the stacking direction. Therefore, displacement of the current collectors 11 at the edges of the negative-electrode active material layers 15, which generally expand and contract more than the positive-electrode active material layer 13, can be restricted.

In addition, the thickness of outer portions of one or both of the positive-electrode active material layers 13 and the negative-electrode active material layers 15 can be smaller than that of inner portions, i.e., the thickness is smaller on the side close to the seal portions 31a and 31b. As shown by example in FIG. 8, the thickness of the negative-electrode active material layers 15 decreases as it approaches the seal portions 31b. Therefore, when the positive-electrode active material layers 13 and the negative-electrode active material layers 15 expand or contract, stress concentration in the current collectors 11 at the edges of the electrodes can be relieved.

The above-described 50-cycle charging/discharging test was performed for the bipolar secondary battery according to the fourth embodiment. A battery voltage was maintained even after 50 cycles of charging and discharging, and good cycle characteristics were exhibited.

In addition, this configuration may be applied to a structure in which the area of the positive-electrode active material layers 13 is larger than that of the negative-electrode active material layers 15, and the edges of each positive-electrode active material layers 13 are positioned outside the edges of a respective negative-electrode active material layer 15 on an opposite side of the adjacent current collector 11 in the stacking direction. In other words, a configuration may be used in which the thickness of the outer portions of the positive-electrode active material layers 13 and the negative-electrode active material layers 15 is smaller than that of the inner portions, i.e., the thickness is smaller on the side close to the seal portions 31a and 31b. In addition, the characteristic of the third embodiment that the thickness of the inner portions of the seal portions 31a and 31b is smaller than that of the outer portions may be combined with that of the fourth embodiment in that the thickness of the outer portions of the positive-electrode active material layer 13 and negative-electrode active material layer 15 are smaller than the inner portions.

Fifth Embodiment

Figure 9:
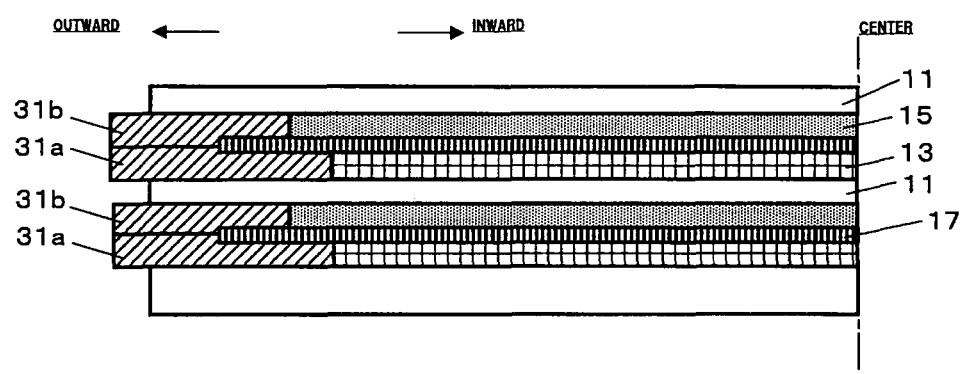
FIG. 9 is a partial cross-sectional view showing an arrangement of seal members of a bipolar secondary battery according to a fifth embodiment of the present invention.

FIG. 9 is a partial cross-sectional view showing an arrangement of seal members 31 of a bipolar secondary battery according to a fifth embodiment. Like in the second embodiment, the edges of the positive-electrode active material layer facing seal portions 31a are positioned inside the edges of the negative-electrode active material layers 15, which are opposite to the positive-electrode active material layers 13 with the current collectors 11 provided between the adjacent layers 13 and 15 in the stacking direction. Therefore, displacement of the current collectors 11 at the edges of the negative-electrode active material layers 15, which generally expand and contract more than the positive-electrode active material layers 13, can be restricted.

In addition, as shown in FIG. 9, the seal portions 31a and 31b are arranged to eliminate spaces between the positive-electrode active material layer facing seal portions 31a and the positive-electrode active material layers 13 and between the negative-electrode active material layer facing seal portions 31b and the negative-electrode active material layers 15. When spaces are present between the seal portions 31a and 31b and the positive-electrode active material layers 13 and the negative-electrode active material layers 15, deformation of the current collectors 11 can occur in the spaces during expansion or contraction of the positive-electrode active material layers 13 and the negative-electrode active material layers 15. However, when the seal portions 31a and 31b are arranged to eliminate the spaces, stress generated in the current collectors 11 can be relieved by restriction of displacement of the current collectors 11.

The above-described 50-cycle charging/discharging test was performed for the bipolar secondary battery according to the fifth embodiment. A battery voltage was maintained even after 50 cycles of charging and discharging, and good cycle characteristics were exhibited.

In addition, this configuration may be applied to a structure in which the area of the positive-electrode active material layers 13 is larger than that of the negative-electrode active material layers 15, and the edges of each positive-electrode active material layer 13 are positioned outside the edges of a respective negative-electrode active material layer 15 on an opposite side of the adjacent current collector 11 in the stacking direction. In other words, a configuration may be used in which the seal portions 31a and 31b are arranged to eliminate the spaces between the positive-electrode active material layer facing seal portions 31a and the positive-electrode active material layers 13 and between the negative-electrode active material layer facing seal portions 31b and the negative-electrode active material layers 15. In addition, the characteristics of the third embodiment and/or the fourth embodiment may be combined.

Sixth Embodiment

Figure 10:
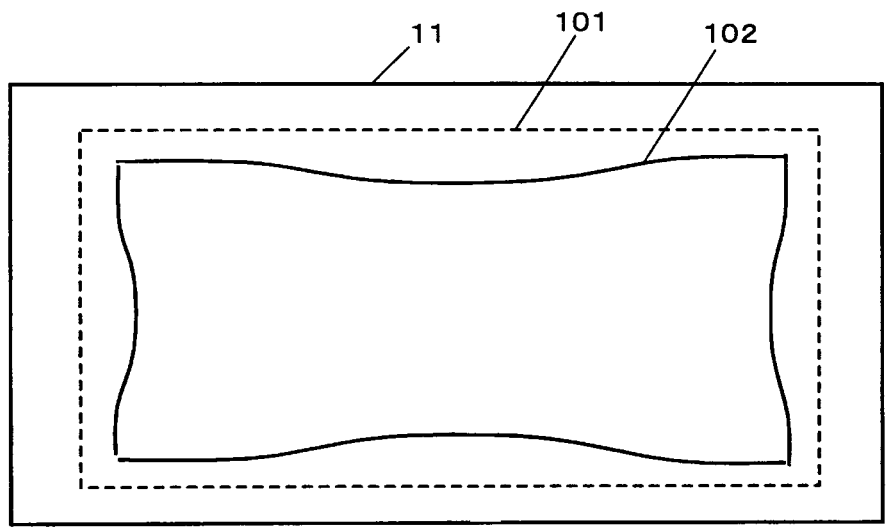
FIG. 10 is a top view showing an arrangement of seal members of a bipolar secondary battery according to a sixth embodiment of the present invention.

FIG. 10 is a top view showing an arrangement of seal portions 31 of a bipolar secondary battery according to a sixth embodiment as viewed from above in the stacking direction. Like in the second to fifth embodiments, the area of the negative-electrode active material layers 15 is larger than that of the positive-electrode active material layers 13. In this case, edges 101 of the negative-electrode active material layer facing seal portions 31b are positioned outside edges 102 of the positive-electrode active material layer facing seal portions 31a.

In the sixth embodiment, as shown in FIG. 10, the edges 102 of the seal portions 31a are waved (i.e., curved), not linear (i.e., straight). As described above, the edges 101 of the negative-electrode active material layer facing seal portions 31b should be positioned outside the edges 102 of the positive-electrode active material layer facing seal portions 31a. However, even when the edges 101 of the negative-electrode active material layer facing seal portions 31b and the edges 102 of the positive-electrode active material layer facing seal portions 31a are at the same position due to dimensional error of design or the like, these edges can be prevented from being linearly arranged. Therefore, stress concentration in the current collectors 11 at the edges of the electrodes 23 can be relieved.

The above-described 50-cycle charging/discharging test was performed for the bipolar secondary battery according to the sixth embodiment. A battery voltage was maintained even after 50 cycles of charging and discharging, and good cycle characteristics were exhibited.

The edges of the positive-electrode active material layers 13 opposite to the edges 102 of seal portions 31a may be also curved, or the edges of only the positive-electrode active material layers 13 may be curved while the edges 102 of the positive-electrode active material layer facing seal portions 31a may be straight.

Although in FIG. 10 the edges 102 of the positive-electrode active material layer facing seal portions 31a are curved, the edges 101 of the negative-electrode active material layer facing seal portions 31b may be curved instead. In this case, the edges of the negative-electrode active material layers 15 opposite to the edges 101 of the negative-electrode active material layer facing seal portions 31b may be also curved, or the edges of only the negative-electrode active material layers 15 may be curved while the edges 101 of the negative-electrode active material layer facing seal portions 31b may be straight.

In addition, this configuration may be applied to a structure in which the area of the positive-electrode active material layers 13 is larger than that of the negative-electrode active material layers 15, and the edges of each positive-electrode active material layer 13 are positioned outside the edges of a respective negative-electrode active material layer 15 on an opposite side of the adjacent current collector 11 in the stacking direction. In addition, at least one of the characteristics of the third to fifth embodiments may be combined.

The present invention is not limited to the above-described embodiments, and various modifications and applications can be made within the scope of the present invention. For example, although the shape of the edges is curved for preventing linear arrangement of the edges in the sixth embodiment, the shape of the edges is not limited to a curved shape, and any shape other than a linear shape may be used.

Although a current collector structure including a resin layer with conductivity is described in each of the embodiments, a structure including a metal layer without a resin layer may be used. However, a current collector containing a resin layer is more influenced by expansion and contraction of the positive-electrode active material layers 13 and the negative-electrode active material layers 15 as compared with a current collector containing a metal layer. As a result, the advantage of the present invention is more exhibited when using a current collector 11 containing a resin layer.

As can be discerned, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A bipolar secondary battery comprising:
a plurality of bipolar electrodes stacked in a stacking direction, each bipolar electrode including a current collector with a first active material layer formed on a first surface of the current collector and the first active material layer having outer edges, and a second active material layer formed on a second surface of the current collector opposite the first surface and the second active material layer having outer edges;
electrolyte layers disposed between the first active material layer and the second active material layer of immediately-adjacent pairs of bipolar electrodes of the plurality of bipolar electrodes; and
a plurality of seal members, each disposed between the current collectors of each immediately-adjacent pairs of bipolar electrodes and about an outer periphery of the electrolyte layer in order to prevent leakage of an electrolyte solution of the electrolyte layers;
wherein the outer edges of the first active material layers are positioned further from a center of the battery in a planar direction than the outer edges of the second active material layers, the planar direction being perpendicular to the stacking direction of the plurality of bipolar electrodes; and
wherein each of the seal members includes a first edge portion and a second edge portion, the first edge portion having an inner surface facing an outer edge of the first active material layer and the second edge portion having an inner surface facing an outer edge of the second active material layer, and the second edge portion extending closer to the center of the battery in the planar direction than the first edge portion such that the second edge portion is overlapping the outer edge of the first active material layer in the stacking direction with the current collector provided therebetween.

2. The bipolar secondary battery of claim 1, wherein the first active material layer is a negative-electrode active material layer.

3. The bipolar secondary battery of claim 1, wherein the thickness of each portion of the first edge portion and the second edge portion decreases as it approaches the center of the battery in the planar direction.

4. The bipolar secondary battery of claim 1, wherein the thickness of at least one of the first active material layer and the second active material layer of each bipolar electrode decreases as it approaches outside the battery in the planar direction.

5. The bipolar secondary battery of claim 1, wherein the inner surface of the first edge portion is disposed to in contact with the outer edge of the first active material layer and the inner surface of the second edge portion is disposed in contact with the outer edge of the second active material layer.

6. The bipolar secondary battery of claim 1, one or both of the inner surface of the first edge portion and the inner surface of the second edge portion has a non-linear shape.

7. The bipolar secondary battery of claim 1, wherein one or both of the outer edges of the first active material layers and the outer edges of the second active material layers has a non-linear shape.

8. An assembled battery comprising a plurality of the bipolar secondary batteries of claim 1, the bipolar secondary batteries being electrically connected to each other.

9. A vehicle comprising the bipolar secondary battery of claim 1 as a motor driving power supply.

10. A method of manufacturing a bipolar secondary battery comprising:
forming a plurality of bipolar electrodes, each formed by applying a first active material layer on a first surface of a collector excluding a peripheral portion of the first surface and applying a second active material layer on a second surface of the collector excluding a peripheral portion of the second surface, wherein the peripheral portion of the first surface is greater in width than the peripheral portion of the second surface;
stacking the plurality of bipolar electrodes with a separator between adjacent bipolar electrodes;
disposing a seal member between adjacent collectors such that the seal member contacts and extends beyond the peripheral portion of the first surface of one of the adjacent collectors and the peripheral portion of the second surface of another of the adjacent collectors, wherein outer edges of the first active material layers are positioned further from a center of the battery in a planar direction than outer edges of the second active material layers, the planar direction being perpendicular to the stacking direction of the plurality of bipolar electrodes;
partially sealing each electrolyte layer by heat sealing the seal member on three sides of each separator;
injecting each separator with electrolyte through a fourth side to form an electrolyte layer; and
finally sealing each separator by heat sealing the seal member the fourth side of each separator such that the seal member disposed between the current collectors is disposed about and in contact with an outer periphery of the electrolyte layer in order to prevent leakage of the electrolyte;
wherein each of the seal members includes a first edge portion and a second edge portion, the first edge portion having an inner surface facing an outer edge of the first active material layer and the second edge portion having an inner surface facing an outer edge of the second active material layer, and the second edge portion extending closer to the center of the battery in the planar direction than the first edge portion such that the second edge portion is overlapping the outer edge of the first active material layer in the stacking direction with the current collector provided therebetween.

11. The method of claim 10, wherein the first active material layer is a negative-electrode active material layer.

12. The method of claim 10, wherein a thickness of at least one of the first active material layer and the second active material layer of each bipolar electrode decreases as it approaches outside the battery in the planar direction.

13. The method of claim 10, wherein the inner surface of the first edge portion is disposed to contact with the outer edge of the first active material layer and the inner surface of the second edge portion is disposed contact with the outer edge of the second active material.

14. The method of claim 10, wherein one or both of the inner surface of the first edge portion and the inner surface of the second edge portion has a non-linear shape.

15. The bipolar secondary battery of claim 1, wherein the first active material layer is a positive-electrode active material layer.

16. The bipolar secondary battery of claim 1, wherein the seal members extend beyond an outer edge of the current collectors in the planar direction.

17. The bipolar secondary battery of claim 1, wherein the inner surface of the first edge portion is spaced from the outer edge of the first active material layer and the inner surface of the second edge portion is spaced from the outer edge of the second active material layer in a planar direction.

18. The bipolar secondary battery of claim 17, wherein the thickness of at least one of the first active material layer and the second active material layer of each bipolar electrode decreases as it approaches outside the battery in the planar direction.

19. The bipolar secondary battery of claim 1, wherein each of the plurality of seal members is disposed between and in contact with the current collectors of each immediately-adjacent pair of bipolar electrodes and disposed about and in contact with the outer periphery of the electrolyte layer.

* * * * *